United States Patent
Chen et al.

(10) Patent No.: US 8,174,623 B2
(45) Date of Patent: May 8, 2012

(54) IMAGE ADJUSTMENT DEVICE AND METHOD THEREOF

(75) Inventors: Yi-Fan Chen, Taichung (TW);
Yun-Hung Shen, Hsinchu (TW);
Chao-Ting Kao, Hsinchu County (TW)

(73) Assignee: Mstar Semiconductor, Inc., Hsinchu (TW)

( * ) Notice: Subject to any disclaimer, the term of this patent is extended or adjusted under 35 U.S.C. 154(b) by 1048 days.

(21) Appl. No.: 12/109,423

(22) Filed: Apr. 25, 2008

(65) Prior Publication Data

US 2008/0284914 A1 Nov. 20, 2008

(30) Foreign Application Priority Data

May 18, 2007 (TW) ................................ 96117707 A

(51) Int. Cl.
*H04N 5/14* (2006.01)
(52) U.S. Cl. ........................................ 348/672; 348/679
(58) Field of Classification Search .................. 348/672, 348/679
See application file for complete search history.

(56) References Cited

U.S. PATENT DOCUMENTS 7,453,524 B2 * 11/2008 Lee et al. ...................... 348/679
* cited by examiner

*Primary Examiner* — Brian Pendleton
*Assistant Examiner* — Olugbenga Idowu
(74) *Attorney, Agent, or Firm* — WPAT, PC; Justin King

(57) ABSTRACT

The present invention provides a device and an image adjustment method by simultaneously adjusting the luminance and the chrominance of an image. The device comprises a luminance analysis device, a contrast adjusting device, a luminance adjusting device, a chrominance compensation device and a luminance gain adjusting device. The method comprises steps of: generating a maximum input luminance signal, an average input luminance signal and a minimum input luminance signal according to an input luminance signal; generating a contrast value according to at least one of the maximum input luminance signal and the average input luminance signal; generating an input luminance offset according to the input luminance signal and the minimum input luminance signal; generating an output chrominance signal according to the contrast value and an input chrominance signal; and generating an output luminance signal according to the input luminance offset and the contrast value.

23 Claims, 9 Drawing Sheets

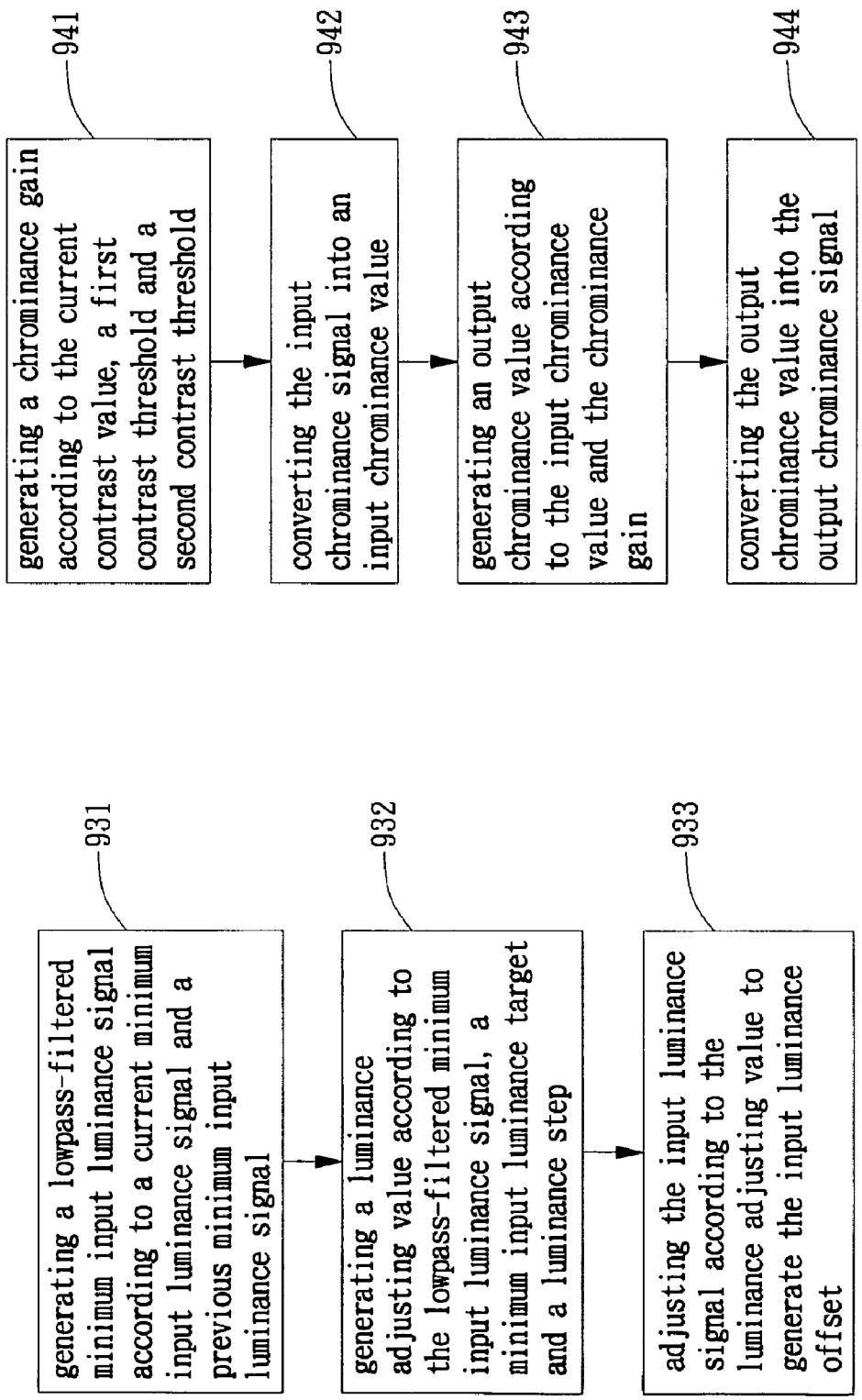

IMAGE ADJUSTMENT DEVICE AND METHOD THEREOF

BACKGROUND OF THE INVENTION

1. Field of the Invention

The present invention generally relates to a device and an image adjustment method and, more particularly, to a device and an image adjustment method by simultaneously adjusting the luminance and the chrominance of an image.

2. Description of the Prior Art

To date, there exist many conventional approaches to image color enhancement based on the information distribution of luminance signals in a frame histogram, which is a relationship diagram with the amount of corresponding luminance values in an image.

Please refer to FIG. 1, which is a schematic circuit diagram for image contrast enhancement with respect to using a statistic histogram in the prior art. In FIG. 1, the input luminance value can be figured out by a statistic histogram extracting device 110 after an input luminance signal Yin is fed into the statistic histogram extracting device 110. Moreover, luminance distribution information 115 corresponding to the luminance value can be obtained in light of the statistic histogram generated by the statistic histogram extracting device 110. Due to the luminance distribution information 115, the luminance curve (the relationship curve between luminance and luminance value) device 120 outputs the luminance curve of a new luminance signal Yout.

Therefore, among the input luminance signal Yin and the input chrominance signal (Cbin, Crin) of every frame in an image, only the input luminance signal Yin is transformed into an output luminance signal Yout by means of the statistic histogram extracting device 110 and the luminance curve device 120.

In the prior art method, even though image contrast is improved, only the luminance is changed but the chrominance is still the same, which leads to the loss of image saturation under some situations. Therefore, blurs occur near the boundaries of picture patterns.

A conventional method for preventing the aforementioned drawback is using a statistic histogram extracting device to obtain an output luminance signal and a compensating function to compensate chrominance signals. Please refer to FIG. 2, which is another conventional circuit diagram for image contrast enhancement. In FIG. 2, not only the input luminance signal Yin passes through a statistic histogram extracting device 210 and a luminance curve device 220 as to obtain an output luminance signal Yout, but also the input chrominance signal (Cbin, Crin) passes through a color compensating device 230 as to obtain an output chrominance signal (Cbout, Crout) according to the input luminance signal Yin and the output luminance signal Yout. The input chrominance signal (Cbin, Crin) of every picture pattern in an image can be compensated as to overcome the blurs near the boundaries of picture patterns using the compensating function of the color compensating device 230.

However, in the prior art method, the image luminance may not meet the viewer's requirements. Therefore, there is a need to provide a method and an image adjustment device by simultaneously adjusting the luminance and the chrominance of an image such that the image luminance and image chrominance can meet the viewer's requirements.

SUMMARY OF THE INVENTION

It is a primary object of the present invention to provide an image adjustment device by simultaneously adjusting the luminance and the chrominance of an image such that the image luminance and image chrominance can meet the viewer's requirements.

It is a secondary object of the present invention to provide an image adjustment method by simultaneously adjusting the luminance and the chrominance of an image such that the image luminance and image chrominance can meet the viewer's requirements.

In order to achieve the foregoing object, the present invention provides an image adjustment device, comprising: a luminance analysis device, receiving an input luminance signal to generate a maximum input luminance signal, an average input luminance signal and a minimum input luminance signal; a contrast adjusting device, receiving at least one of the maximum input luminance signal and the average input luminance signal to generate a contrast value; a luminance adjusting device, receiving the input luminance signal and the minimum input luminance signal to generate an input luminance offset; a chrominance compensation device, receiving the contrast value and an input chrominance signal to generate an output chrominance signal; and a luminance gain adjusting device, receiving the input luminance offset and the contrast value to generate an output luminance signal.

The present invention further provides an image adjustment method, comprising steps of: image adjustment method, comprising steps of: generating a maximum input luminance signal, an average input luminance signal and a minimum input luminance signal according to an input luminance signal; generating a contrast value according to at least one of the maximum input luminance signal and the average input luminance signal; generating an input luminance offset according to the input luminance signal and the minimum input luminance signal; generating an output chrominance signal according to the contrast value and an input chrominance signal; and generating an output luminance signal according to the input luminance offset and the contrast value.

The present invention discloses a method and an image adjustment device by simultaneously adjusting the luminance and the chrominance of an image such that the image luminance and image chrominance can meet the viewer's requirements.

BRIEF DESCRIPTION OF THE DRAWINGS

The objects, spirits and advantages of the preferred embodiments of the present invention will be readily understood by the accompanying drawings and detailed descriptions, wherein:

FIG. 11 is a flow-chart of a step of generating an input luminance offset in an image adjustment method according to the present invention; and FIG. 12 is a flow-chart of a step of generating an output chrominance signal in an image adjustment method according to the present invention.

DETAILED DESCRIPTION OF THE PREFERRED EMBODIMENT

Figure 1:
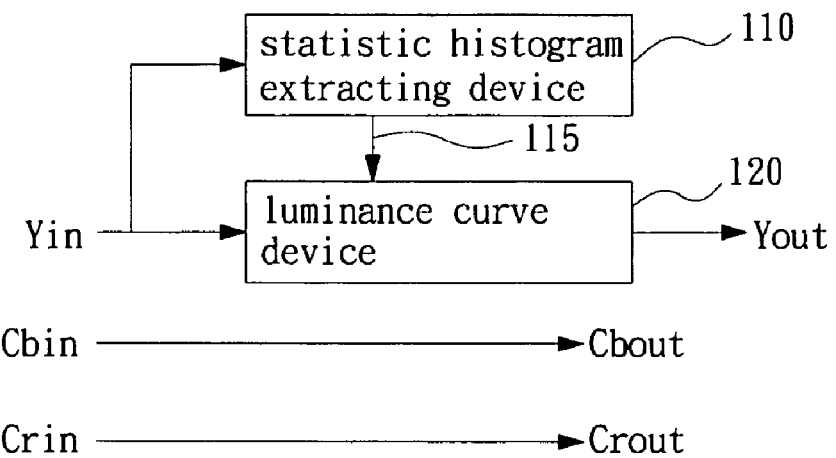
FIG. 1 is a schematic circuit diagram of the prior art for image contrast enhancement with respect to using a statistic histogram.
Figure 2:
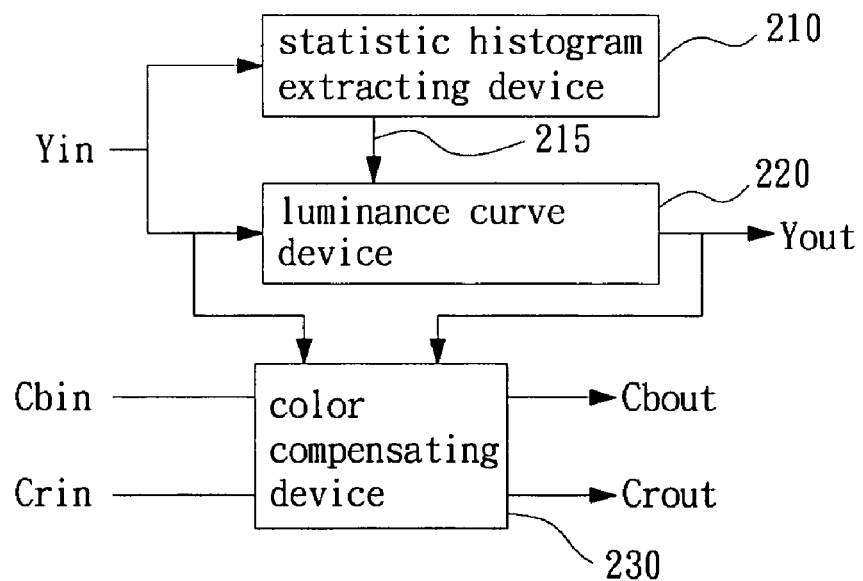
FIG. 2 is another schematic circuit diagram of the prior art for image contrast enhancement.
Figure 3:
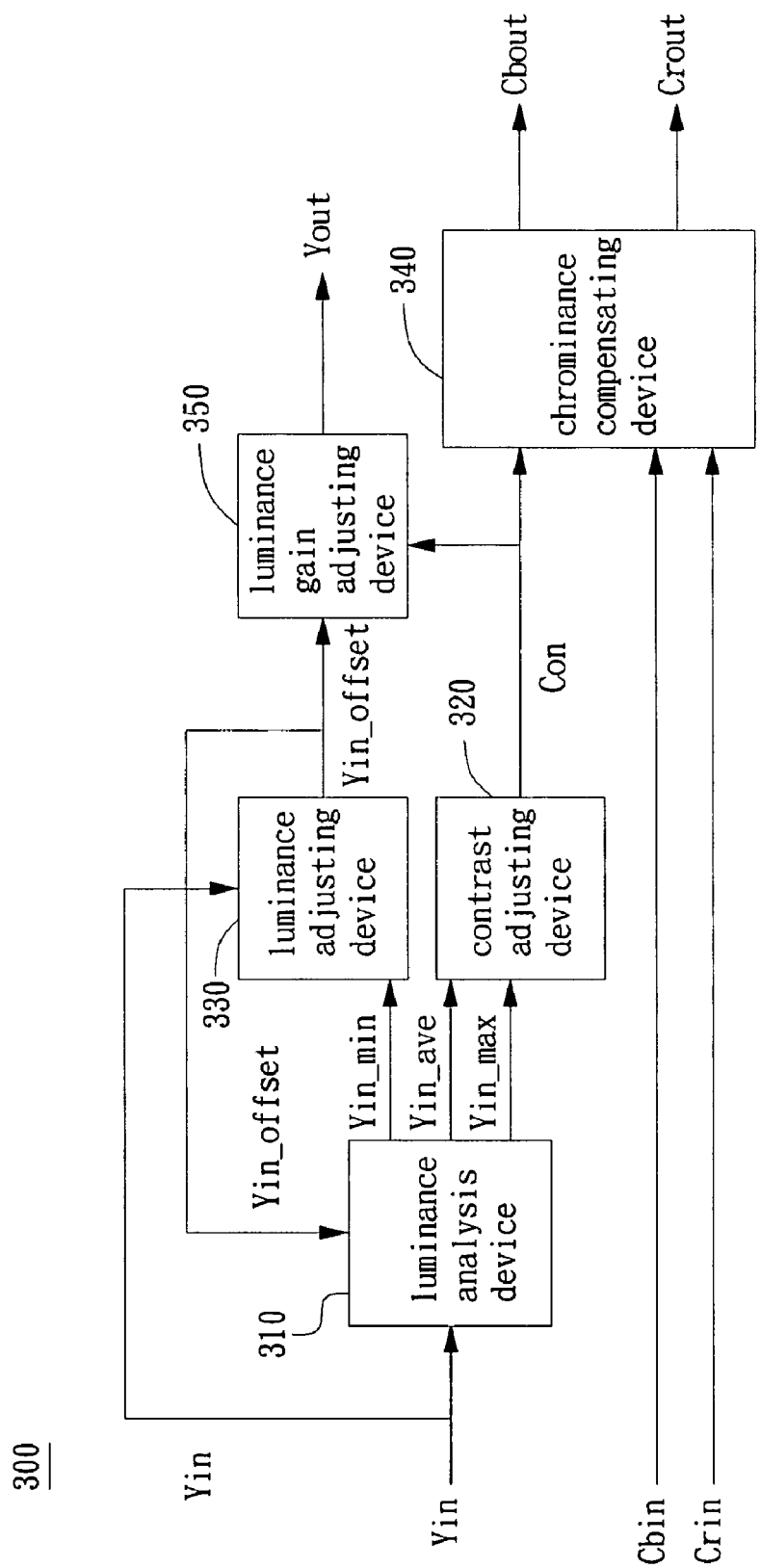
FIG. 3 is a schematic circuit diagram of an image adjustment device according to the present invention.

Please refer to FIG. 3, which is a schematic circuit diagram of an image adjustment device according to the present invention. In FIG. 3, the image adjustment device 300 comprises a luminance analysis device 310, a contrast adjusting device 320, a luminance adjusting device 330, a chrominance compensating device 340 and a luminance gain adjusting device 350.

More particularly, the luminance analysis device 310 receives an input luminance signal Yin to generate a maximum input luminance signal Yin_max, an average input luminance signal Yin_ave and a minimum input luminance signal Yin_min. In one embodiment, the luminance analysis device 310 is a statistic histogram extracting device capable of determining the grey scale distribution of the input luminance signal Yin in an image to generate the maximum input luminance signal Yin_max, the average input luminance signal Yin_ave and the minimum input luminance signal Yin_min, which represent the input luminance signal Yin. The contrast adjusting device 320 receives at least one of the maximum input luminance signal Yin_max and the average input luminance signal Yin_ave to generate a contrast value Con. The luminance adjusting device 330 receives the input luminance signal Yin and the minimum input luminance signal Yin_min to generate an input luminance offset Yin_offset. The chrominance compensation device 340 receives the contrast value Con and an input chrominance signal (Cbin, Crin) to generate an output chrominance signal (Cbout, Crout). The luminance gain adjusting device 350 receives the input luminance offset Yin_offset and the contrast value Con to generate an output luminance signal Yout. In one embodiment, the luminance gain adjusting device 350 is an adder to multiply the input luminance offset Yin_offset by the contrast value Con to generate the output luminance signal Yout.

Figure 4:
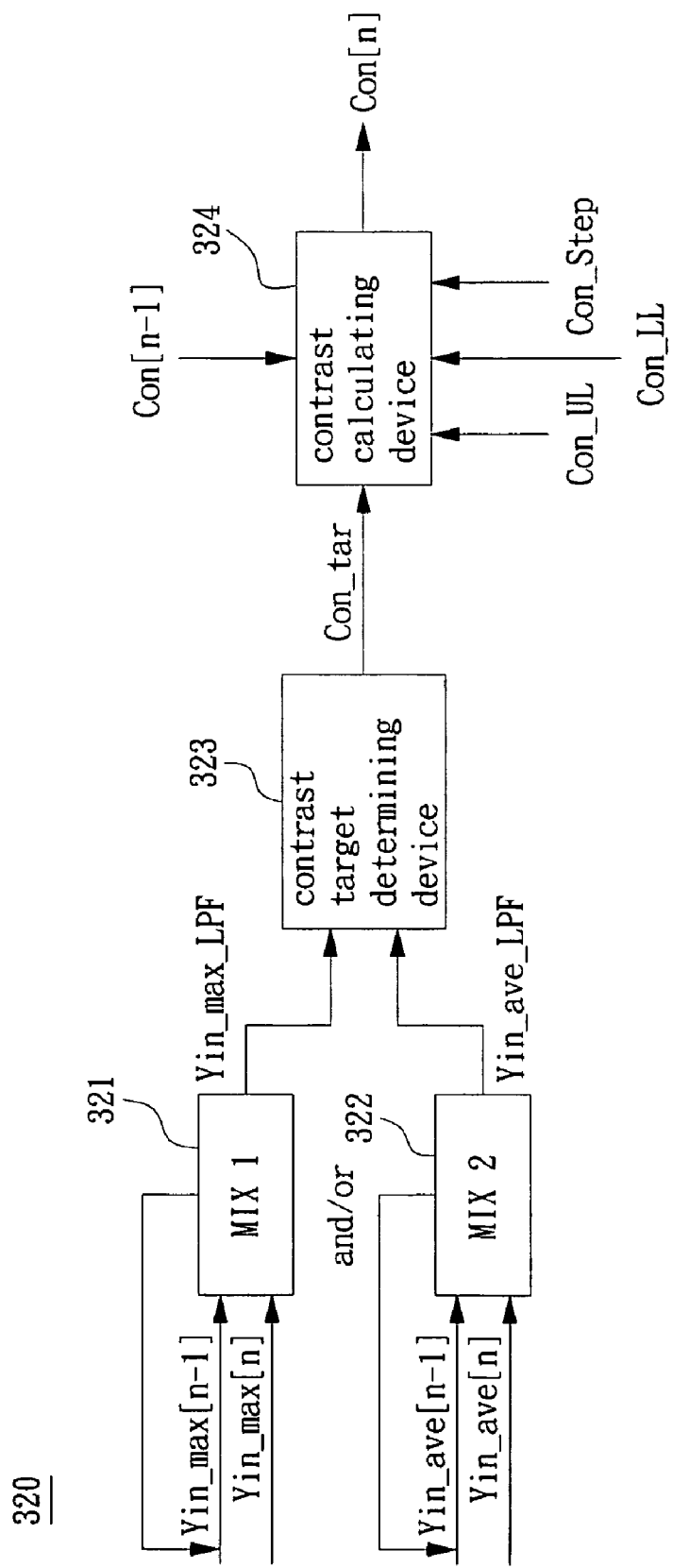
FIG. 4 is a schematic circuit diagram of a contrast adjusting device of an image adjustment device according to one embodiment of the present invention.

For further detailed description, please refer to FIG. 4, which is a schematic circuit diagram of a contrast adjusting device of an image adjustment device according to one embodiment of the present invention. In FIG. 4, the contrast adjusting device 320 comprises a first mixer 321, a second mixer 322, a contrast target determining device 323 and a contrast calculating device 324. The contrast target determining device 323 receives at least one of a first signal and a second signal to generate a contrast target Con_tar. The contrast calculating device 324 receives the contrast target Con_tar, a previous contrast value Con[n−1], a lower-bound contrast limit Con_LL, an upper-bound contrast limit Con_UL and a contrast step Con_Step to generate a current contrast value Con[n].

More particularly, the first mixer 321 is coupled to the contrast target determining device 323 to receive a current maximum input luminance signal Yin_max[n] and a previous maximum input luminance signal Yin_max[n−1] to generate a low-pass filtered maximum input luminance signal Yin_max_LPF. The second mixer 322 is coupled to the contrast target determining device 323 to receive a current average input luminance signal Yin_ave[n] and a previous average input luminance signal Yin_ave[n−1] to generate a low-pass filtered average input luminance signal Yin_ave_LPF. The first signal is the low-pass filtered maximum input luminance signal Yin_max_LPF and the second signal is the low-pass filtered average input luminance signal Yin_ave_LPF.

In one embodiment, the first mixer 321 and the second mixer 322 are α-blending circuits with an adjustable weighting parameter α or low-pass filters.

In one embodiment, the contrast target determining device 323 is a look-up-table (LUT) circuit capable of determining the contrast target Con_tar according to at least one of the low-pass filtered maximum input luminance signal Yin_max_LPF and the low-pass filtered average input luminance signal Yin_ave_LPF. In another embodiment, the contrast target determining device 323 is an operational circuit capable of determining the contrast target Con_tar by calculating at least one of the low-pass filtered maximum input luminance signal Yin_max_LPF and the low-pass filtered average input luminance signal Yin_ave_LPF.

The algorithm for calculating the current contrast value Con[n] can be expressed as:

```
If (Con[n−1]<Con_tar)
    Con[n]= Con[n−1] + Con_step
Else if (Con[n−1]>Con_tar)
    Con[n]= Con[n−1] − Con_step
Else
    Con[n]= Con[n−1]
```

More particularly, the contrast calculating device 324 compares the contrast target Con_tar and the previous contrast value Con[n−1]. If the previous contrast value Con[n−1] is smaller than the contrast target Con_tar, the current contrast value Con[n] will be equal to the previous contrast value Con[n−1] plus contrast step Con_Step. If the previous contrast value Con[n−1] is larger than the contrast target Con_tar, the current contrast value Con[n] will be equal to the previous contrast value Con[n−1] minus the contrast step Con_Step. If the previous contrast value Con[n−1] is equal to the contrast target Con_tar, the current contrast value Con[n] will be equal to the previous contrast value Con[n−1].

Even though the present invention is exemplified by the above preferred embodiments, the present invention is not limited thereto. For example, the contrast adjusting device 320 can only comprise the first mixer 321 or the second mixer 322. If the contrast adjusting device 320 only comprises the first mixer 321, the contrast target determining device 323 generates the contrast target Con_tar according to one or both of the low-pass filtered maximum input luminance signal Yin_max_LPF and the current average input luminance signal Yin_ave[n]. Under such a circumstance, the first signal is the low-pass filtered maximum input luminance signal Yin_max_LPF and the second signal is the current average input luminance signal Yin_ave[n]. Similarly, if the contrast adjusting device 320 only comprises the second mixer 322, the contrast target determining device 323 generates the contrast target Con_tar according to one or both of the low-pass filtered average input luminance signal Yin_ave_LPF and the current maximum input luminance signal Yin_max[n]. Under such a circumstance, the first signal is the current maximum input luminance signal Yin_max[n] and the second signal is the low-pass filtered average input luminance signal Yin_ave_LPF.

In another embodiment, the contrast adjusting device 320 comprises neither the first mixer 321 nor the second mixer 322. Under such a circumstance, the contrast target determining device 323 generates the contrast target Con_tar according to one or both of the current maximum input luminance signal Yin_max[n] and the current average input luminance signal Yin_ave[n], instead of according to the low-pass filtered maximum input luminance signal Yin_max_LPF or the low-pass filtered average input luminance signal Yin_ave_LPF. In other words, under such a circumstance, the first signal is the current maximum input luminance signal Yin_max[n] and the second signal is the current average input luminance signal Yin_ave[n].

Figure 5:
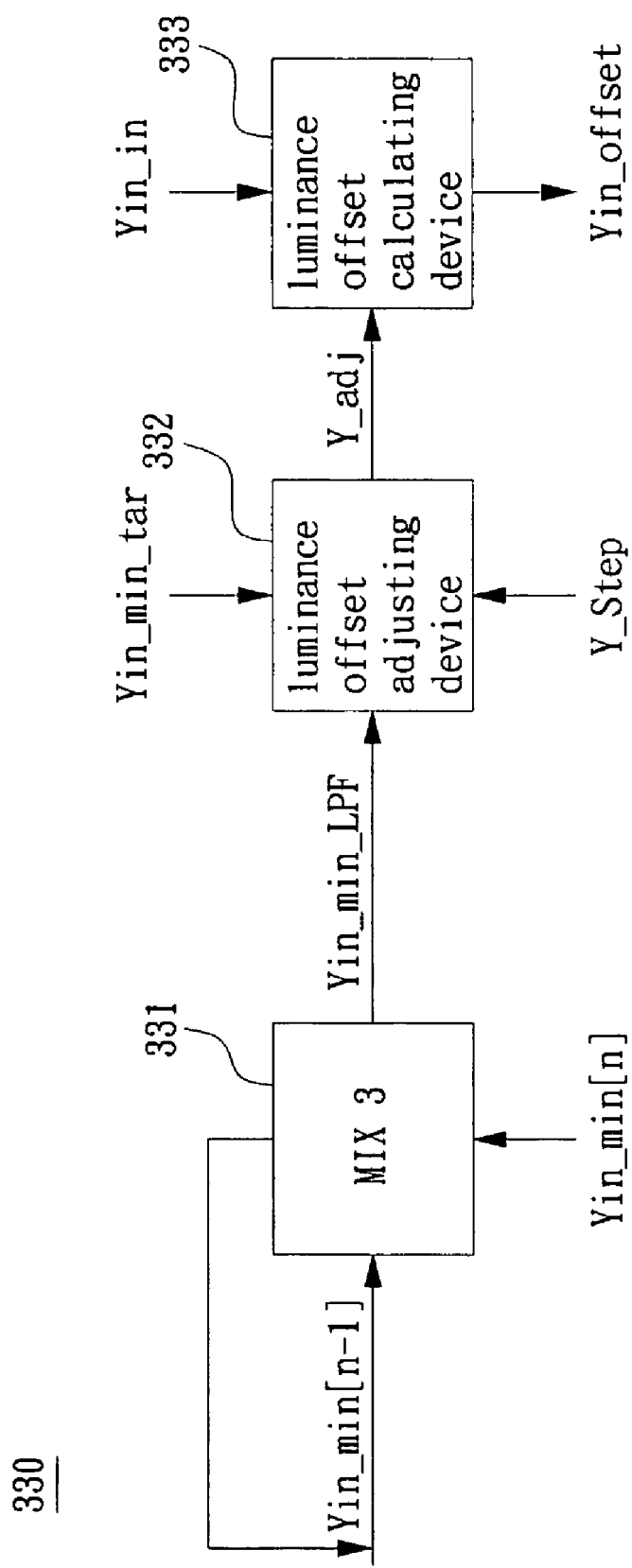
FIG. 5 is a schematic circuit diagram of a luminance adjusting device of an image adjustment device according to one embodiment of the present invention.

Please refer to FIG. 5, which is a schematic circuit diagram of a luminance adjusting device of an image adjustment device according to one embodiment of the present invention. In FIG. 5, the luminance adjusting device 330 comprises a third mixer 331, a luminance offset calculating device 332 and a luminance offset adjusting device 333.

The luminance offset calculating device 332 receives a third signal, a minimum input luminance target Yin_min_tar and a luminance step Y_Step to generate a luminance adjusting value Y_adj. The luminance offset adjusting device 333 receives the luminance adjusting value Y_adj and the input luminance signal Yin to generate the input luminance offset Yin_offset.

More particularly, the third mixer 331 receives a current minimum input luminance signal Yin_min[n] and a previous minimum input luminance signal Yin_min[n−1] to generate a low-pass filtered minimum input luminance signal Yin_min_LPF. The third signal is the low-pass filtered minimum input luminance signal Yin_min_LPF.

In one embodiment, the third mixer 331 is an α-blending circuit with an adjustable weighting parameter α or a low-pass filter.

More particularly, the luminance offset calculating device 332 compares the low-pass filtered minimum input luminance signal Yin_min_LPF and the minimum input luminance target Yin_min_tar. If the low-pass filtered minimum input luminance signal Yin_min_LPF is smaller than the minimum input luminance target Yin_min_tar, the luminance offset calculating device 332 determines the luminance adjusting value Y_adj to be a positive luminance step Y_Step. Similarly, if the low-pass filtered minimum input luminance signal Yin_min_LPF is larger than the minimum input luminance target Yin_min_tar, the luminance offset calculating device 332 determines the luminance adjusting value Y_adj to be a negative luminance step Y_Step.

The luminance offset adjusting device 333 is an adder capable of adding or subtracting a luminance step Y_Step to or from the input luminance signal Yin to generate the input luminance offset Yin_offset.

In another embodiment, the luminance adjusting device 330 can still work even if it does not comprise the third mixer 331. Under such a circumstance, the luminance offset calculating device 332 receives the minimum input luminance signal Yin_min, a minimum input luminance target Yin_min_tar and a luminance step Y_Step to generate a luminance adjusting value Y_adj. In other words, the third signal is the minimum input luminance signal Yin_min.

Figure 6:
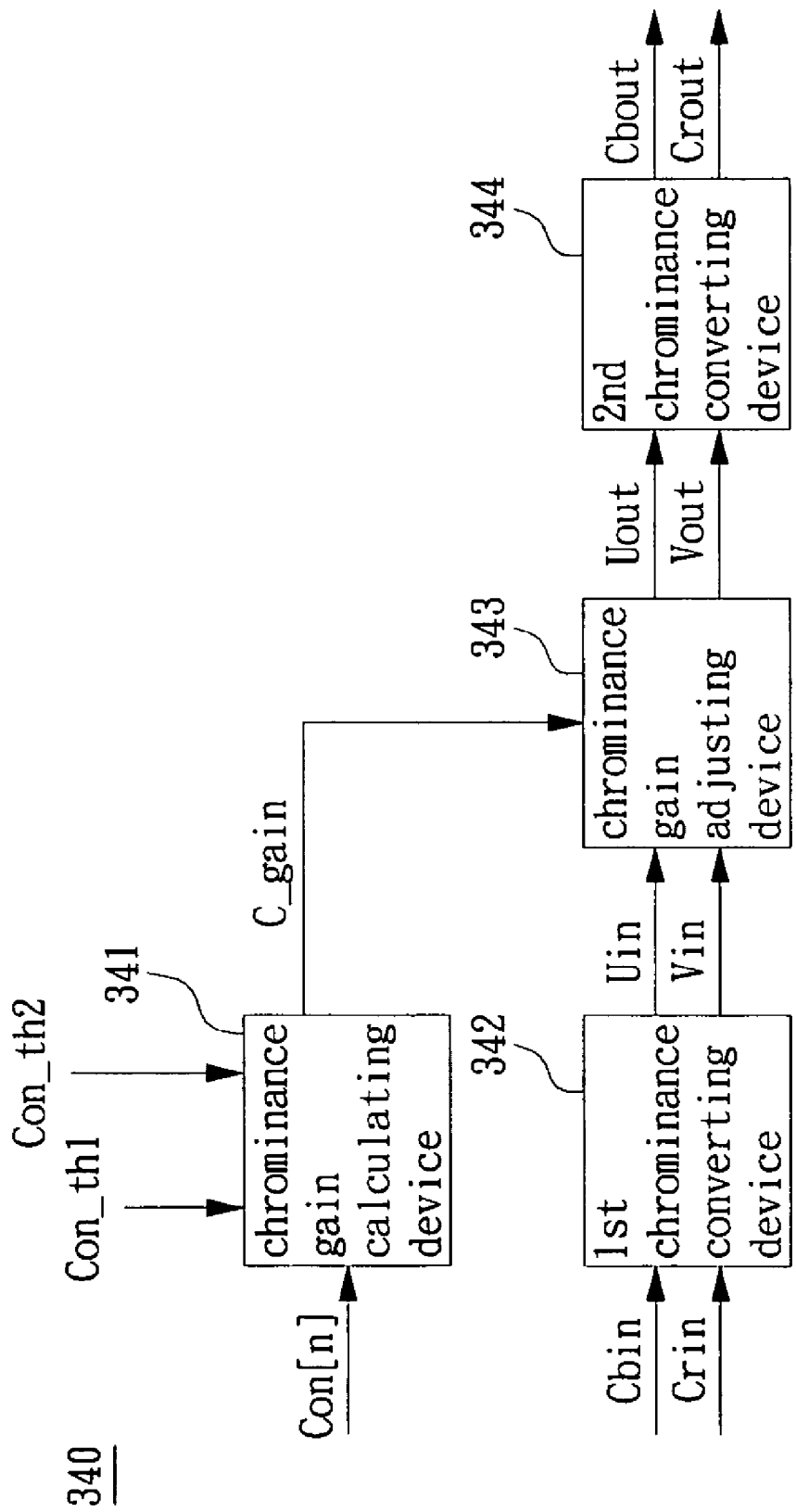
FIG. 6 is a schematic circuit diagram of a chrominance compensating device of an image adjustment device according to one embodiment of the present invention.

Please refer to FIG. 6, which is a schematic circuit diagram of a chrominance compensating device of an image adjustment device according to one embodiment of the present invention. In FIG. 6, the chrominance compensating device 340 comprises a chrominance gain calculating device 341, a first chrominance converting device 342, a chrominance gain adjusting device 343 and a second chrominance converting device 344.

More particularly, the chrominance gain calculating device 341 receives the current contrast value Con[n], a first contrast threshold Con_th1 and a second contrast threshold Con_th2 to generate a chrominance gain C_gain. The first chrominance converting device 342 receives and converts the input chrominance signal (Cbin, Crin) to generate an input chrominance value (Uin, Vin). The chrominance gain adjusting device 343 receives the input chrominance value (Uin, Vin) and the chrominance gain C_gain to generate an output chrominance value (Uout, Vout). The second chrominance converting device 344 receives and converts the output chrominance value (Uout, Vout) to generate the output chrominance signal (Cbout, Crout).

In one embodiment, the chrominance gain adjusting device 343 is a multiplier capable of multiplying the input chrominance value (Uin, Vin) by the chrominance gain C_gain to generate the output chrominance value (Uout, Vout).

Figure 7:
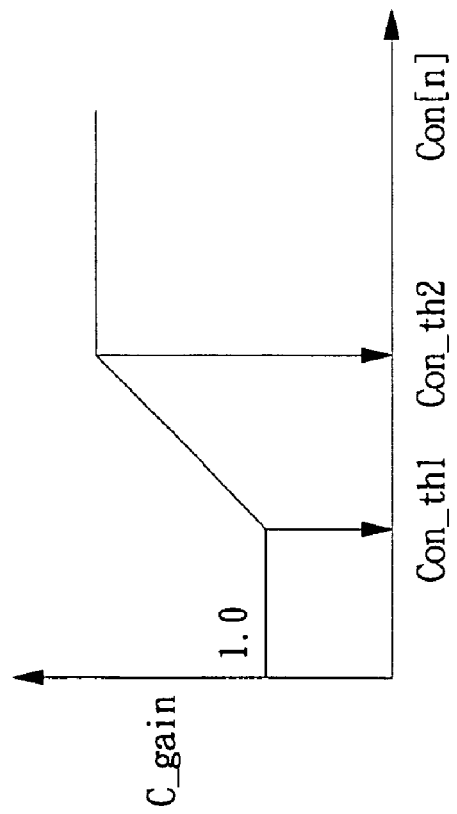
FIG. 7 is a graph showing a transfer curve of a chrominance gain calculating device of the chrominance compensating device in FIG. 6.

For a better understanding of how the chrominance gain calculating device 341 generates the chrominance gain C_gain, please refer to FIG. 7, which is a graph showing a transfer curve of a chrominance gain calculating device of the chrominance compensating device in FIG. 6. In FIG. 7, the first contrast threshold Con_th1 and the second contrast threshold Con_th2 are pre-determined parameters. When the current contrast value Con[n] is smaller than or equal to the first contrast threshold Con_th1, for example, the chrominance gain C_gain can be set to 1. When the current contrast value Con[n] is between the first contrast threshold Con_th1 and the second contrast threshold Con_th2, the chrominance gain C_gain increases with the current contrast value Con[n]. When the current contrast value Con[n] is larger than the first contrast threshold Con_th2, the chrominance gain C_gain stops increasing and stay fixed at a gain.

Figure 8:
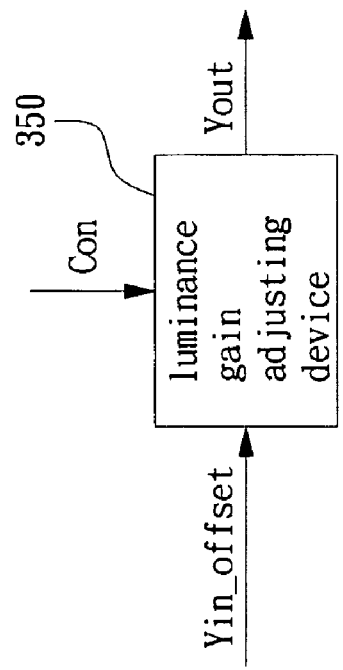
FIG. 8 is a schematic circuit diagram of a luminance compensating device of an image adjustment device according to one embodiment of the present invention.

Please refer to FIG. 8, which is a schematic circuit diagram of a luminance compensating device of an image adjustment device according to one embodiment of the present invention. In FIG. 8, the luminance gain adjusting device 350 receives the input luminance offset Yin_offset and the contrast value Con to generate an output luminance signal Yout. In one embodiment, the luminance gain adjusting device 350 is a multiplier capable of multiplying the input luminance offset Yin_offset by the contrast value Con to generate the output luminance signal Yout.

Figure 9:
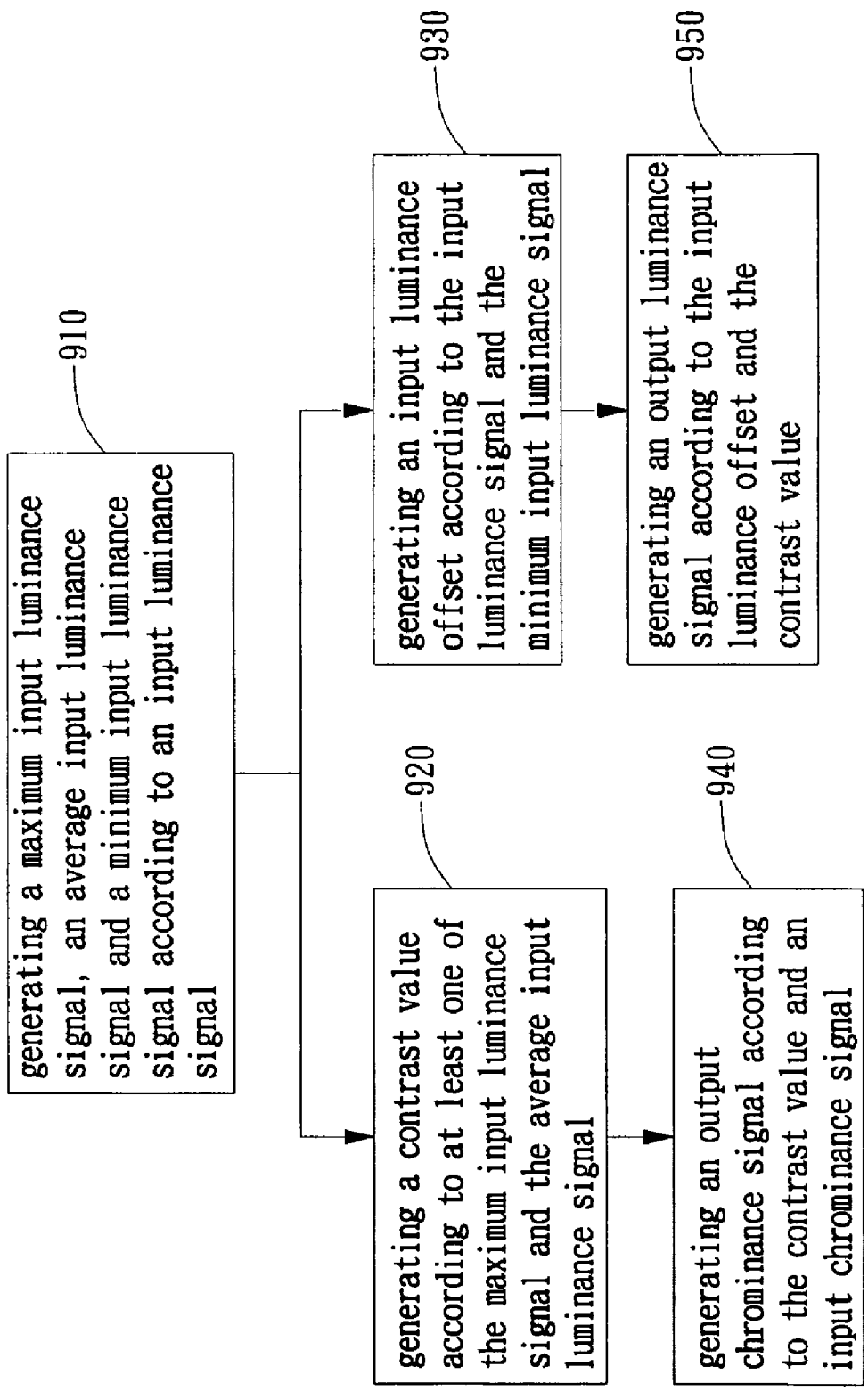
FIG. 9 is a flow-chart of an image adjustment method according to the present invention.

Using the image adjustment device described by FIG. 1 to FIG. 8, the present invention provides an image adjustment method depicted in a flow-chart in FIG. 9 comprising steps described hereinafter.

First, in Step 910, a maximum input luminance signal Yin_max, an average input luminance signal Yin_ave and a minimum input luminance signal Yin_min are generated according to an input luminance signal Yin.

In Step 920, a contrast value Con is generated according to at least one of the maximum input luminance signal Yin_max and the average input luminance signal Yin_ave generated in Step 910.

In Step 930, an input luminance offset Yin_offset is generated according to the input luminance signal Yin and the minimum input luminance signal Yin_min generated in Step 910.

Then, in Step 940, an output chrominance signal (Cbout, Crout) is generated according to the contrast value Con generated in Step 920 and an input chrominance signal (Cbin, Crin).

In Step 950, an output luminance signal Yout is generated according to the input luminance offset Yin_offset generated in Step 930 and the contrast value Con generated in Step 920.

Figure 10:
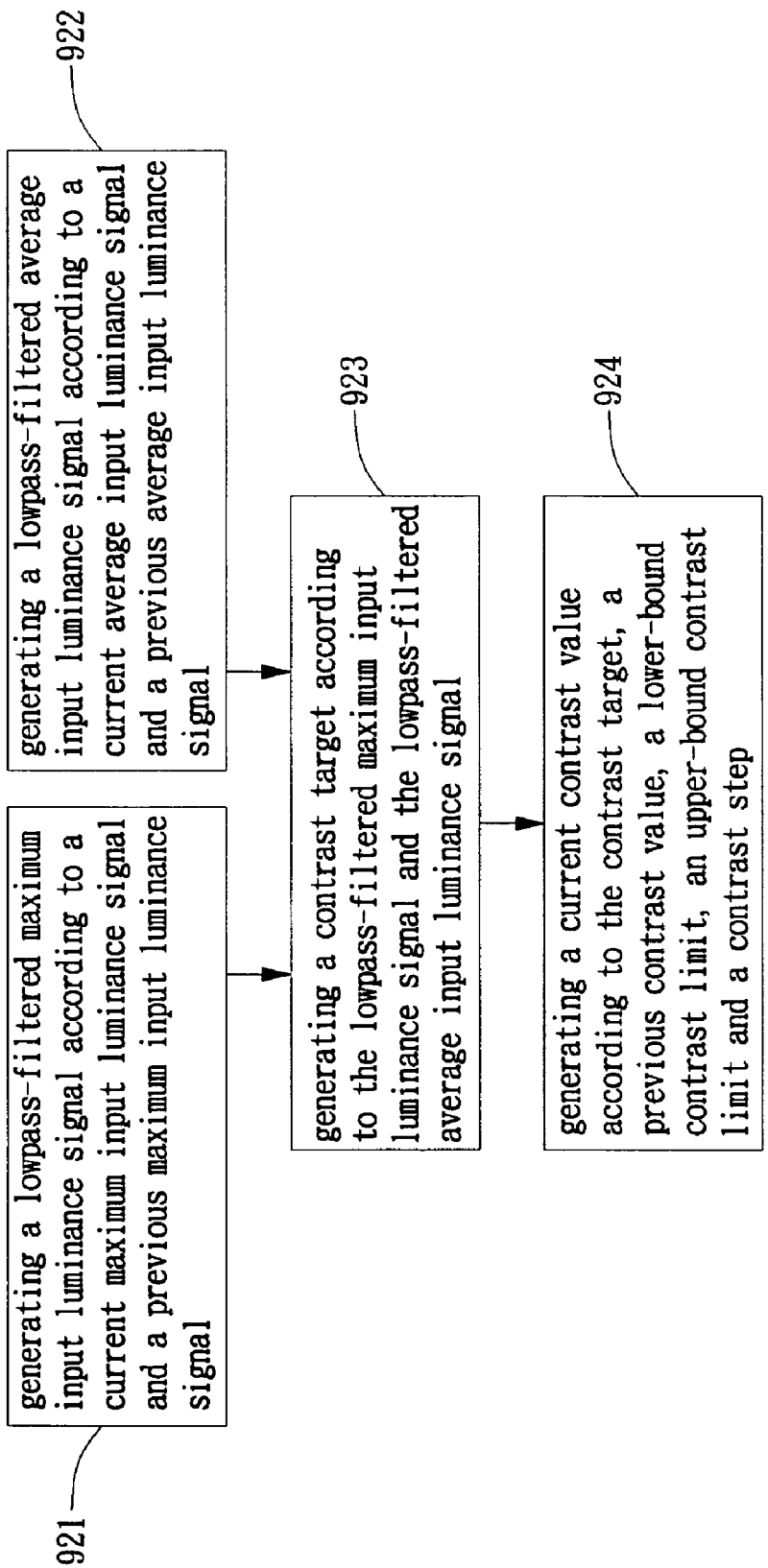
FIG. 10 is a flow-chart of a step of generating a contrast value in an image adjustment method according to the present invention.

For further detailed description, please refer to FIG. 10, which is a flow-chart of a step of generating a contrast value in an image adjustment method according to the present invention.

In Step 921, a current maximum input luminance signal Yin_max[n] is low-pass filtered to generate a low-pass filtered maximum input luminance signal Yin_max_LPF according to a current maximum input luminance signal Yin_max[n] and previous maximum input luminance signal Yin_max[n−1].

In Step 922, a current average input luminance signal Yin_ave[n] is low-pass filtered to generate a low-pass filtered average input luminance signal Yin_ave_LPF according to a current average input luminance signal Yin_ave [n] and a previous average input luminance signal Yin_ave [n−1].

In Step 923, a contrast target Con_tar is generated according to at least one of a first signal and a second signal.

More particularly, the first signal is the low-pass filtered maximum input luminance signal Yin_max_LPF and the second signal is the low-pass filtered average input luminance signal Yin_ave_LPF. In other words, in Step 923, the contrast target Con_tar is generated according to the low-pass filtered maximum input luminance signal Yin_max_LPF and the low-pass filtered average input luminance signal Yin_ave_LPF. In another embodiment, in Step 923, the contrast target Con_tar is determined with reference to one or both of the low-pass filtered maximum input luminance signal Yin_max_LPF and the low-pass filtered average input luminance signal Yin_ave_LPF. In another embodiment, in Step 923, the contrast target Con_tar is obtained by calculating the low-pass filtered maximum input luminance signal Yin_max_LPF, or the low-pass filtered average input luminance signal Yin_ave_LPF or both.

In Step 924, a current contrast value Con[n] is generated according to the contrast target Con_tar, a previous contrast value Con[n−1], a lower-bound contrast limit Con_LL, an upper-bound contrast limit Con_UL and a contrast step Con_Step.

The algorithm for calculating the current contrast value Con[n] can be expressed as:

```
If (Con[n−1]<Con_tar)
    Con[n]= Con[n−1] + Con_step
Else if (Con[n−1]>Con_tar)
    Con[n]= Con[n−1] − Con_step
Else
    Con[n]= Con[n−1]
```

More particularly, in Step 924, the contrast target Con_tar and the previous contrast value Con[n−1] are compared. If the previous contrast value Con[n−1] is smaller than the contrast target Con_tar, the current contrast value Con[n] will be equal to the previous contrast value Con[n−1] plus the contrast step Con_Step. If the previous contrast value Con[n−1] is larger than the contrast target Con_tar, the current contrast value Con[n] will be equal to the previous contrast value Con[n−1] minus the contrast step Con_Step. If the previous contrast value Con[n−1] is equal to the contrast target Con_tar, the current contrast value Con[n] will be equal to the previous contrast value Con[n−1].

Even though the present invention is exemplified by the above preferred embodiments, the present invention is not limited thereto. For example, the image adjustment method can selectively conduct only one of Step 921 and Step 922. If the image adjustment method conducts only Step 921, the contrast target Con_tar is generated according to one or both of the low-pass filtered maximum input luminance signal Yin_max_LPF and the current average input luminance signal Yin_ave[n]. Under such a circumstance, the first signal is the low-pass filtered maximum input luminance signal Yin_max_LPF and the second signal is the current average input luminance signal Yin_ave[n]. Similarly, if the image adjustment method conducts only Step 922, the contrast target Con_tar is generated according to one or both of the low-pass filtered average input luminance signal Yin_ave_LPF and the current maximum input luminance signal Yin_max[n]. Under such a circumstance, the first signal is the current maximum input luminance signal Yin_max[n] and the second signal is the low-pass filtered average input luminance signal Yin_ave_LPF.

In another embodiment, the image adjustment method may comprise neither Step 921 nor Step 922. Under such a circumstance, in Step 923, the contrast target Con_tar is generated according to one or both of the current maximum input luminance signal Yin_max[n] and the current average input luminance signal Yin_ave[n], instead of according to the low-pass filtered maximum input luminance signal Yin_max_LPF or the low-pass filtered average input luminance signal Yin_ave_LPF. In other words, under such a circumstance, the first signal is the current maximum input luminance signal Yin_max[n] and the second signal is the current average input luminance signal Yin_ave[n].

Please refer to FIG. 11, which is a flowchart of a step of generating an input luminance offset in an image adjustment method according to the present invention.

First, in Step 931, a current minimum input luminance signal Yin_min[n] is low-pass filtered to generate a low-pass filtered minimum input luminance signal Yin_min_LPF according to the current minimum input luminance signal Yin_min[n] and a previous minimum input luminance signal Yin_min[n−1].

In Step 932, a luminance adjusting value Y_adj is generated according to a third signal, a minimum input luminance target Yin_min_tar and a luminance step Y_Step. In the present embodiment, the third signal is the low-pass filtered minimum input luminance signal Yin_min_LPF. More particularly, in Step 932, the low-pass filtered minimum input luminance signal Yin_min_LPF and the minimum input luminance target Yin_min_tar are compared. If the low-pass filtered minimum input luminance signal Yin_min_LPF is smaller than the minimum input luminance target Yin_min_tar, the luminance adjusting value Y_adj is determined to be a positive luminance step Y_Step. Similarly, if the low-pass filtered minimum input luminance signal Yin_min_LPF is larger than the minimum input luminance target Yin_min_tar, the luminance adjusting value Y_adj is determined to be a negative luminance step Y_Step.

In Step 933, the input luminance signal Yin is adjust to generate the input luminance offset Yin_offset according to the luminance adjusting value Y_adj. More particularly, in Step 933, the input luminance offset Yin_offset is generated by adding or subtracting the luminance step Y_Step to or from the input luminance signal Yin.

In another embodiment, the image adjustment method can still work even if it does not comprise Step 931. Under such a circumstance, the third signal is the minimum input luminance signal Yin_min. In Step 932, a luminance adjusting value Y_adj is generated according to the minimum input luminance signal Yin_min, a minimum input luminance target Yin_min_tar and a luminance step Y_Step.

Please further refer to FIG. 12, which is a flowchart of a step of generating an output chrominance signal in an image adjustment method according to the present invention.

First, in Step 941, a chrominance gain C_gain is generated according to a current contrast value Con[n], a first contrast threshold Con_th1 and a second contrast threshold Con_th2.

In Step 942, the input chrominance signal (Cbin, Crin) is received and converted into an input chrominance value (Uin, Vin).

In Step 943, an output chrominance value (Uout, Vout) is generated according to the input chrominance value (Uin, Vin) and the chrominance gain C_gain.

Then in Step 944, the output chrominance value (Uout, Vout) is received and converted into the output chrominance signal (Cbout, Crout).

In one embodiment, in Step 944, the input chrominance value (Uin, Vin) is multiplied by the chrominance gain C_gain to generate the output chrominance value (Uout, Vout).

According to the above discussion, it is apparent that the present invention discloses a method and an image adjustment device by simultaneously adjusting the luminance and the chrominance of an image such that the image luminance and image chrominance can meet the viewer's requirements. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A image adjustment device, comprising:
    a luminance analysis device, receiving an input luminance signal to generate a maximum input luminance signal, an average input luminance signal and a minimum input luminance signal;
    a contrast adjusting device, receiving at least one of the maximum input luminance signal and the average input luminance signal to generate a contrast value;
    a luminance adjusting device, receiving the input luminance signal and the minimum input luminance signal to generate an input luminance offset;
    a chrominance compensation device, receiving the contrast value and an input chrominance signal to generate an output chrominance signal; and
    a luminance gain adjusting device, receiving the input luminance offset and the contrast value to generate an output luminance signal.

2. The image adjustment device as recited in claim 1, wherein the luminance analysis device is a statistic histogram extracting device.

3. The image adjustment device as recited in claim 1, wherein the contrast adjusting device comprises:
    a contrast target determining device, receiving at least one of a first signal and a second signal to generate a contrast target; and
    a contrast calculating device, receiving the contrast target, a previous contrast value, a lower-bound contrast limit, an upper-bound contrast limit and a contrast step to generate a current contrast value.

4. The image adjustment device as recited in claim 3, wherein the first signal is the maximum input luminance signal and the second signal is the average input luminance signal.

5. The image adjustment device as recited in claim 3, wherein the contrast adjusting device further comprises:
    a first mixer, coupled to the contrast target determining device to receive a current maximum input luminance signal and a previous maximum input luminance signal to generate a low-pass filtered maximum input luminance signal; and
    a second mixer, coupled to the contrast target determining device to receive a current average input luminance signal and a previous average input luminance signal to generate a low-pass filtered average input luminance signal;
    wherein the first signal is the low-pass filtered maximum input luminance signal and the second signal is the low-pass filtered average input luminance signal.

6. The image adjustment device as recited in claim 3, wherein the contrast adjusting device further comprises:
    a first mixer, coupled to the contrast target determining device to receive a current maximum input luminance signal and a previous maximum input luminance signal to generate a low-pass filtered maximum input luminance signal;
    wherein the first signal is the low-pass filtered maximum input luminance signal and the second signal is the average input luminance signal.

7. The image adjustment device as recited in claim 3, wherein the contrast adjusting device further comprises:
    a second mixer, coupled to the contrast target determining device to receive a current average input luminance signal and a previous average input luminance signal to generate a low-pass filtered average input luminance signal;
    wherein the first signal is the maximum input luminance signal and the second signal is the low-pass filtered average input luminance signal.

8. The image adjustment device as recited in claim 3, wherein the contrast target determining device is a look-up-table (LUT) circuit.

9. The image adjustment device as recited in claim 1, wherein the luminance adjusting device comprises:
    a luminance offset calculating device, receiving a third signal, a minimum input luminance target and a luminance step to generate a luminance adjusting value; and
    a luminance offset adjusting device, receiving the luminance adjusting value and the input luminance signal to generate the input luminance offset.

10. The image adjustment device as recited in claim 9, wherein the third signal is the minimum input luminance signal.

11. The image adjustment device as recited in claim 9, wherein the luminance adjusting device further comprises:
    a third mixer, coupled to the luminance offset calculating device to receive a current minimum input luminance signal and a previous minimum input luminance signal to generate a low-pass filtered minimum input luminance signal;
    wherein the third signal is the low-pass filtered minimum input luminance signal.

12. The image adjustment device as recited in claim 1, wherein the chrominance compensation device comprises:
    a chrominance gain calculating device, receiving the contrast value, a first contrast threshold and a second contrast threshold to generate a chrominance gain;

a first chrominance converting device, receiving the input chrominance signal to generate an input chrominance value;

a chrominance gain adjusting device, receiving the input chrominance value and the chrominance gain to generate an output chrominance value; and a second chrominance converting device, receiving the output chrominance value to generate the output chrominance signal.

13. The image adjustment device as recited in claim 1, wherein the luminance gain adjusting device is a multiplier.

14. An image adjustment method, comprising steps of:

generating a maximum input luminance signal, an average input luminance signal and a minimum input luminance signal according to an input luminance signal;

generating a contrast value according to at least one of the maximum input luminance signal and the average input luminance signal;

generating an input luminance offset according to the input luminance signal and the minimum input luminance signal;

generating an output chrominance signal according to the contrast value and an input chrominance signal; and generating an output luminance signal according to the input luminance offset and the contrast value.

15. The image adjustment method as recited in claim 14, wherein the step of generating the contrast value further comprises steps of:

generating a contrast target according to at least one of a first signal and a second signal; and generating a current contrast value according to the contrast target, a previous contrast value, a lower-bound contrast limit, an upper-bound contrast limit and a contrast step.

16. The image adjustment method as recited in claim 15, wherein the first signal is a current maximum input luminance signal and the second signal is a current average input luminance signal.

17. The image adjustment method as recited in claim 14, wherein the step of generating the contrast value further comprises steps of:

generating a low-pass filtered maximum input luminance signal according to the maximum input luminance signal and a previous maximum input luminance signal; and generating a low-pass filtered average input luminance signal according to the average input luminance signal and a previous average input luminance signal;

wherein the first signal is the low-pass filtered maximum input luminance signal and the second signal is the low-pass filtered average input luminance signal.

18. The image adjustment method as recited in claim 14, wherein the step of generating the contrast value further comprises a step of:

generating a low-pass filtered maximum input luminance signal according to the maximum input luminance signal and a previous maximum input luminance signal;

wherein the first signal is the low-pass filtered maximum input luminance signal and the second signal is the average input luminance signal.

19. The image adjustment method as recited in claim 14, wherein the step of generating the contrast value further comprises a step of:

generating a low-pass filtered average input luminance signal according to the average input luminance signal and a previous average input luminance signal;

wherein the first signal is the maximum input luminance signal and the second signal is the low-pass filtered average input luminance signal.

20. The image adjustment method as recited in claim 14, wherein the step of generating the input luminance offset further comprises steps of:

generating a luminance adjusting value according to a third signal, a minimum input luminance target and a luminance step; and generating the input luminance offset according to the luminance adjusting value and the input luminance signal.

21. The image adjustment method as recited in claim 20, wherein the third signal is the minimum input luminance signal.

22. The image adjustment method as recited in claim 20, wherein the step of generating the input luminance offset further comprises a step of:

generating a low-pass filtered minimum input luminance signal according to a previous minimum input luminance signal and the minimum input luminance signal;

wherein the third signal is the low-pass filtered minimum input luminance signal.

23. The image adjustment method as recited in claim 14, wherein the step of generating the output chrominance signal further comprises steps of:

generating a chrominance gain according to the contrast value, a first contrast threshold and a second contrast threshold;

generating an input chrominance value according to the input chrominance signal;

generating an output chrominance value according to the input chrominance value and the chrominance gain; and generating the output chrominance signal according to the output chrominance value.

* * * * *